United States Patent [19]

Harbarger et al.

[11] Patent Number: 5,024,207
[45] Date of Patent: Jun. 18, 1991

[54] HEATING APPARATUS AND METHOD FOR SEMICONDUCTOR MATERIAL SLICING PROCESS

[75] Inventors: Josephine A. Harbarger; David Oliver; Ella L. Anthony, all of Phoenix, Ariz.

[73] Assignee: Motorola, Inc., Schaumburg, Ill.

[21] Appl. No.: 581,161

[22] Filed: Sep. 10, 1990

Related U.S. Application Data

[63] Continuation of Ser. No. 428,568, Oct. 30, 1989, abandoned.

[51] Int. Cl.⁵ ............................................. B28D 7/04
[52] U.S. Cl. .................................. 125/35; 125/13.01; 51/322
[58] Field of Search .. 125/13R, 35; 51/113.5, 229, 322; 269/11, 21

[56] References Cited

U.S. PATENT DOCUMENTS 4,652,135 3/1987 Ono ........................................ 269/21
4,667,650 5/1987 Girard et al. ...................... 125/13 R Primary Examiner—M. Rachuba
Attorney, Agent, or Firm—Joe E. Barbee; Robert M. Handy

[57] ABSTRACT

A localized heating apparatus and method for breaking an adhesive joint between a mounting block of a semiconductor material slicing apparatus and a semiconductor material ingot, provide a more localized, and therefore faster, heating and cooling of the mounting block which reduces the time required for the semiconductor material slicing process.

4 Claims, 1 Drawing Sheet

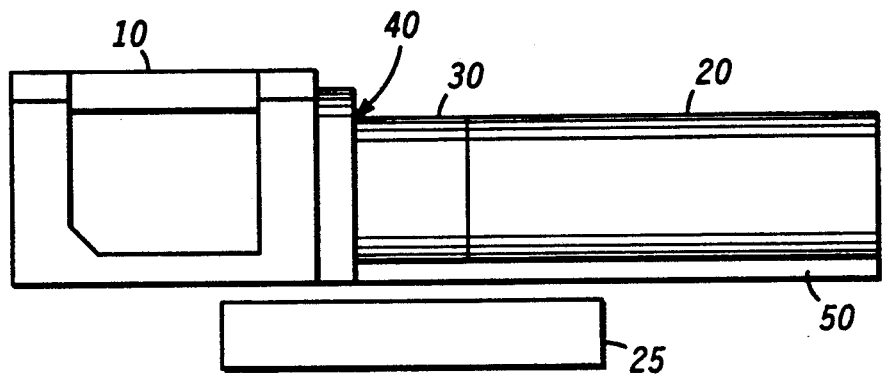
FIG. 1
-PRIOR ART-
FIG. 2
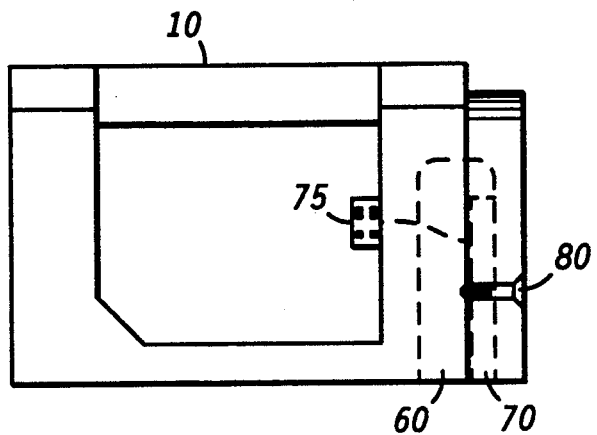

HEATING APPARATUS AND METHOD FOR SEMICONDUCTOR MATERIAL SLICING PROCESS

This application is a continuation of prior application Ser. No. 428,568 filed Oct. 30, 1989 now abandoned.

BACKGROUND OF THE INVENTION

This invention relates in general to the slicing of semiconductor material ingots into wafers. More particularly, the present invention relates to an apparatus and method for providing localized heating to the adhesive joint between a mounting block and semiconductor material ingot thereby providing a relatively fast heating of the adhesive joint and resultant demounting of the semiconductor material ingot from the mounting block.

As part of the process of slicing a semiconductor material ingot into wafers for further processing, the semiconductor material ingot is ordinarily attached to a mounting block which is used to guide the ingot into the cutting area of a slicing machine. Once the slicing has been completed, or in some cases before the slicing has been started, the adhesive joint which is used to attach the ingot to the mounting block must be broken in order to prepare the mounting block for attachment of a new semiconductor material ingot. This demounting of the residual ingot is ordinarily accomplished by heating the entire mounting block/ingot combination on a hot plate thereby raising the temperature of the adhesive joint to the point at which the joint fails.

Since the entire mounting/ingot combination is being heated this process ordinarily consumes a relatively long time for both the heating and the cooling of the mounting block which must be accomplished prior to the mounting of a new ingot. In some cases this mounting block/ingot joint must be broken even before the slicing has been accomplished which requires that the entire mounting block/ingot combination be moved thereby increasing the risk of damage to the ingot.

SUMMARY OF THE INVENTION

It is therefore an object of the present invention to provide a localized heating of the adhesive joint which is used to join a mounting block and semiconductor material ingot in a semiconductor material slicing process thereby reducing the amount of time required to break a given adhesive joint.

It is further an object of the present invention to provide a localized heating apparatus on a mounting block which may be utilized to heat and therefore break an adhesive joint between a mounting block and a semiconductor material ingot without removing the mounting block/ingot combination from the slicing apparatus.

The foregoing and other objects are achieved in the present invention wherein there is provided a localized heating element adjacent to the mounting face on the mounting block of a semiconductor material slicing apparatus which provides localized, and therefore much more rapid, heating of the joint which ordinarily is used to attach a given semiconductor material ingot to the mounting block of the semiconductor material slicing apparatus.

This localized heating element may also include a quick disconnect electrical contact to allow the use of the localized heating element while the mounting block/ingot combination is contained in the slicing apparatus, thereby enabling its use without removal of the mounting block/ingot combination from the slicing apparatus.

The method of the present invention includes the steps of mounting a material ingot on the mounting face of a slicing apparatus with a thermally softenable adhesive, inserting the resultant mounting block/material ingot combination into the slicing apparatus for slicing of a portion of the material ingot, and removing the residue of the material ingot from the mounting block by heating a localized portion of the mounting block near the mounting face to soften the adhesive joint between the material ingot and the mounting face.

BRIEF DESCRIPTION OF THE DRAWINGS

The above and other features and objects of the invention and the manner of attaining them will become more apparent in the invention itself best understood by reference to the following description of an embodiment of the invention taken in conjunction with the accompanying drawings wherein:

FIG. 1 is an illustration of a prior art method used to heat and therefore break the adhesive joint between a mounting block and a semiconductor material ingot; and FIG. 2 is a side view of a typical mounting block including the localized heating element of the present invention.

DESCRIPTION OF A PREFERRED EMBODIMENT

As part of the process for manufacturing integrated circuits a generally cylindrical ingot of semiconductor material is ordinarily sliced into thin sheets called wafers. As illustrated in FIG. 1 a typical ingot 20 may be attached to a mounting block 10 using an adhesive at joint 40 between the mounting block and the ingot. Depending on the particular apparatus being used a spacer 30 may be mounted between the ingot 20 and mounting block 10. In addition a mounting beam 50 may be mounted to the bottom of the ingot and spacer.

This entire combination of ingot 20, spacer 30, mounting block 10 and mounting beam 50 is then slowly fed into a slicing machine, such as an STC I D slicer manufactured by Silicon Technology Corporation of Oakland, N. J. for slicing the ingot 20 into wafers which are further processed to produce particular discrete devices or integrated circuits.

The mounting block 10 and mounting beam 50 provide accurate alignment and support for ingot 20 as it is being fed into the slicing apparatus. Once a given ingot 20 has been completely sliced any remaining portion of ingot 20 and spacer 30 must be removed from mounting block 10 by breaking the adhesive joint 40. This is ordinarily accomplished by heating the joint to the point at which the adhesive breaks down. Depending on the particular adhesive being used this may occur at an elevated temperature on the order of 500 to 600 degrees F.

This has been previously accomplished by placing the entire mounting block/ingot combination on a hot plate 25 and heating the entire mounting block/ingot combination until the adhesive joint 40 has reached a temperature at which it fails. This may require for example from 5 to 6 hours in the case where the adhesive must be heated to between 500 and 600 degrees F. In addition to this relatively lengthy heating period there must be a cool down period of about 1½ hours in order to allow mounting block 10 to cool down for subsequent cleaning and mounting of a new ingot for slicing.

As can be seen this procedure requires the removal of the entire mounting block/ingot combination to a remote location for placement on a hot plate 25. In some cases, such as the defective or incorrect mounting of an ingot on the mounting block, this must be accomplished with a new ingot which may weigh on the order of 40 to 50 pounds. This handling of the mounting block/ingot combination significantly increases the risk of damage to the ingot prior or subsequent to the slicing process.

FIG. 2 illustrates the heating element 70 of the present invention which has been mounted in cavity 60 of mounting block 10 utilizing a screw 80 through the mounting face of mounting block 10. This localized heating element 70 is used to heat only the mounting face of mounting block 10, and therefore adhesive joint 40, and the immediately surrounding area. This localized heating provides for not only a more rapid heating of the adhesive joint and demounting of the ingot, but a more rapid cool down since the entire mass of the mounting block has not been heated but only that portion which is immediately adjacent to the adhesive joint. This localized heating provides for a substantial reduction in the amount of time required to remove a given residual ingot 20 and/or spacer 30 from mounting block 10 and to remount a new ingot for processing in a slicing apparatus. For the preferred embodiment shown the time required to heat the adhesive joint to the required temperature has been reduced to about 15 minutes. The heating element may be, for example, an HSP-30, 600 watt heater manufactured by Cromalox Industrial Heating Products of Pittsburg, Pa. In the preferred embodiment this heating element has been mounted inside cavity 60 of mounting block 10 of an STC I D slicer. In addition there may be provided a disconnectable electrical connection 75 connected to heating element 20 in order that it may be energized while the mounting block/ingot combination is still mounted on the slicing apparatus, thereby eliminating the need for removal of the mounting block/ingot combination from the slicing apparatus in order to break the adhesive joint. This is particularly useful to avoid excess handling of the ingot prior to the slicing process.

The method of the present invention includes mounting a material ingot on the mounting face of a slicing apparatus with a thermally softenable adhesive and inserting the resultant mounting block/material ingot combination into the slicing apparatus for slicing of a portion of the material ingot. Once the slicing operation is complete, the residue of the material ingot is removed from the mounting block by heating a localized portion of the mounting block near the mounting face to soften the adhesive joint between the material ingot and the mounting face. This localized heating reduces both the heating and cooling time thereby substantially reducing the total cycle time required for the slicing of a given material ingot.

What has been provided therefore is a localized heating apparatus and method for breaking the adhesive joint between a mounting block and a semiconductor material ingot utilized in the process of slicing a semiconductor material ingot into individual wafers. While the above description is given in connection with a specific slicing apparatus and heating element, it is to be understood that the inventive heating element or process may be used in any application which requires the demounting of a semiconductor material ingot from a mounting block by heating an adhesive joint to a given elevated temperature. Changes in form and detail or application to other semiconductor slicing apparatus may be made by one skilled in the art without departing from the scope of the invention as described in the appended claims.

We claim:

1. A method for slicing a material ingot comprising the steps of:

mounting said material ingot on a mounting face of a mounting block of a slicing apparatus with a thermally softenable adhesive to form a mounting block/material ingot combination;

inserting said mounting block/material ingot combination into said slicing apparatus for slicing of said material ingot, wherein a residue of said material ingot remains attached to said mounting block after a portion of said material ingot has been sliced; and removing said residue of said material ingot from said mounting block by energizing a heating element mounted on said mounting block to heat only a localized portion of said mounting block near said mounting face to soften the adhesive between the material ingot and the mounting face.

2. A method for slicing a material ingot comprising the steps of:

providing a mounting means having a mounting face for mounting a semiconductor containing ingot thereto, wherein the mounting means comprises a cavity located behind the mounting face so that the mounting face is partially thermally isolated from another part of the mounting means by which the mounting means is attached to a sawing means for sawing the ingot;

using a heater attached to the mounting means, heating the mounting face to a predetermined temperature for softening an adhesive for attaching the semiconductor containing ingot to the mounting face, while the other part of the mounting means remains below the predetermined temperature;

attaching a portion of the semiconductor containing ingot to the mounting face with the heat softened adhesive; and cooling the mounting face to below the predetermined temperature.

3. A method for slicing a material ingot in accordance with claim 2 wherein said mounting means includes a heating element mounted in said cavity adjacent to said mounting face.

4. A method for slicing a material ingot in accordance with claim 3 further comprising the steps of:

sawing a portion of said semiconductor ingot leaving a remaining portion attached to said mounting means; and re-heating the mounting face to said predetermined temperature for softening said adhesive to remove said remaining portion, while the other part of the mounting means remains below the predetermined temperature.

* * * * *